Patented Apr. 17, 1951

2,549,331

UNITED STATES PATENT OFFICE 2,549,331

CHEESE PRODUCTION

Sigurd Orla-Jensen, Copenhagen, Denmark

No Drawing. Application July 6, 1948, Serial No. 37,302. In the Netherlands July 25, 1947

4 Claims. (Cl. 99—116)

I have shown that the ripening of hard rennet cheese is due to purely enzymatic processes. Thus the chymosin of the rennet after having coagulated the cheese milk will tend to dissolve the cheese mass, and moreover the cheese mass is subjected to the action of the endoenzymes of the ripening bacteria. This latter action will not set in until the ripening bacteria are dead and autolyzation has taken place, since it is only under these conditions that the endoenzymes will be capable of acting upon the surrounding mass of cheese. The proportion of these enzymes increases in proportion to the number of ripening bacteria incorporated with the cheese mass.

The bacterium of greatest importance for the ripening of Emmentaler cheese is a rod-formed lactic acid bacterium which will not proliferate at room temperature, but has its optimum growth at 40–45° C. Many years ago I gave to this organism the name of *Thermobacterium helveticum* now generally adopted. In the ordinary method of producing Emmentaler cheese, arrived at by practical experience, the growth of this bacterium is favored. It is present in the fourth stomach of the calf and when in the cheese-dairy this rennet is extracted from this stomach by means of boiled acidified whey at about 37° C. it develops therein and accordingly it will be added with the rennet to the cheese milk. In order to maintain a high temperature in the cheese mass on the press the cheese mass is scalded at 53° C. and the heated cheese mass is assembled into a lump and removed from the hot whey in this shape. Furthermore the cheeses are made very large (70–100 kgs.). As a result of these efforts the *Thermobacterium helveticum* has about 24 hours in which to grow in the cheese mass on the press before the temperature in the interior part of the large cheese has dropped too much and consequently the cheese mass or green cheese after 24 hours should contain not less than a billion of these organisms per gram of the mass.

This method of working presents, however, certain deficiencies and inconveniences. As a result of the scalding at such high temperature one of the ripening factors, the chymosin of the rennet, is totally destroyed and the ripening bacteria proper are impaired. Moreover it is troublesome and requires much labor to handle the large cheeses in the cheese store. Every cheese must be wiped off and turned upside down once a day and in some cases it must also be salted. In transport and in household use it should also be more convenient to deal with smaller cheeses.

The main purpose of my invention is to avoid these deficiencies and inconveniences. At the same time a shorter duration of the ripening process is aimed at. This is achieved generally by incorporating an abundant proportion of *Thermobacterium helveticum* in the cheese milk still before the addition of rennet thereto. The formation of this ripening bacterium is therefore independent of the growth thereof during the pressing operation. The presence of a greater number of the bacteria in question can be secured resulting in a shortening of the time necessary for the ripening process. In addition propionic acid bacteria may also be added to the cheese milk and in connection with this embodiment of my invention it is possible to shorten the ripening period still more by carrying out the ripening process at a higher temperature than that of the usual cheese stores, for instance at 23° C., under anaerobic conditions. In this process propionic acid bacteria serve as producers of carbon dioxide to keep the air away from the cheese mass in addition to their functioning as producers of a part of the aroma of the cheese. Consequently in this case salting must be carried out after ripening in order not to interfere with the action of the propionic acid bacteria.

With these general statements of the objects and purposes of my invention I will now proceed to describe the embodiment thereof and the manner in which my invention is carried out, and it will be understood that while I have described what may be considered as a preferable embodiment of my invention, I do not limit myself to the precise conditions or proportions herein set forth, as they may be varied by those skilled in the art in accordance with the particular purposes for which they are intended, and the conditions under which they are to be utilized.

According to my invention I allow *Thermobacterium helveticum* to grow in the cheese milk, before coagulation by rennet until at least the same proportion of bacteria has been obtained in the curd as will be obtained in the known method at the end of the pressing. In accordance with the present invention consequently *Thermobacterium helveticum* is added in abundant quantities to the cheese milk and this organism is then caused to grow in the milk before the addition of rennet.

A suitable growth of the said organism in the cheese milk will thus be obtained when adding for instance 1–4% of a pure culture of *Thermobacterium helveticum* to the cheese milk and allowing subsequently the bacteria to grow for a period of time which at 40–45° C. will amount in the first case (1% culture) to a few hours, in the latter case (4% culture) to one hour. When varying the proportion of pure culture or the temperature the period of time during which the milk is left to stand for growth of the bacteria must be varied accordingly, so that a suitable development thereof is obtained.

According to my invention it is advantageous to use cheese milk pasteurized at high temperature, in which case the propagation of *Thermobacterium helveticum* can be controlled by the degree of acidity obtained. A suitable propagation has been obtained when the acidity has attained slightly more than 11 Soxhlet-Henkel degrees. If the milk is not pasteurized at high temperature, however, this degree of acidity will partially be due to *Streptococcus thermophilus*, which organism will always contribute to acidity in ordinary Emmentaler cheese, but is without significance as a ripening factor. Pasteurization of the cheese milk is moreover favorable to avoid the growth of noxious bacteria like *coli* and *aerogenes* bacteria. Pasteurization at low temperature is, however, unsuitable in the case of milk to be used for Emmentaler cheese, since as previously shown by me, *Thermobacterium helveticum* proliferates particularly badly in milk that has been pasteurized at low temperature. The growth of *Streptococcus thermophilus* in such milk is not avoided.

When the cheese milk has been treated in this manner there is no need for scalding at 53° C. or for making large cheeses, but any shape or size can be given to the cheeses.

In view of the fact that the pH value optimum to the ripening of the Emmentaler cheese is 5.1–5.2 it is favorable to remove again part of the acid formed during the growth of the thermobacteria. Preferably this is not done by neutralization by means of sodium bicarbonate, but by careful washing of the curd which will also remove part of the lactates. In a particularly advantageous embodiment of the present invention, therefore, the curd is subjected to careful washing so that pH in the finished cheese mass will be between 5.1 and 5.2.

In the further treatment of the cheese two different ways may be used. One of these ways is to treat the cheese in a manner similar to that ordinarily used in the production of Emmentaler cheese, i. e. the cheese is moulded and pressed and kept on store with the usual treatment during storage. In this case, however, especially when milk pasteurized at high temperature has been used, a slight inoculation of the cheese milk with propionic acid bacteria ought to be undertaken, since according to the investigations of the inventor usually not only the cavities ("eyes") of Emmetaler cheese are usually formed by such bacteria, but, at least as far as some varieties concern, they also contribute to some degree to the fine sweet aroma of this cheese. Cheese produced in this manner will be ripened after 3 months of storage, whereas it takes at least double that time to obtain ripeness in the large Emmentaler cheeses, produced in the ordinary way.

The other way, which can be used in the further treatment of the cheese according to the present invention is to ferment the cheese mass in containers under anaerobic conditions at the optimal temperature before salting and moulding.

For this purpose the cheese mass may be pressed and subsequently stamped tightly—if necessary after cutting the lightly pressed cheese mass into pieces—into suitable containers, for instance such the lid of which can be kept in its place by a spring in order to allow the carbon dioxide developed by the propionic acid fermentation to escape without allowing atmospheric oxygen to penetrate into the container. The containers are left to stand at the optimum temperature, about 23° C. Under these conditions which will very soon be completely anaerobic the development of mould or other obligate aerobic micro-organisms is avoided. In addition the propionates are themselves antibiotic to mould. The ripening of the cheese under these conditions will take place in weeks as compared with months required under ordinary conditions and there is no work to do in connection with the storage of the cheese in this manner. It is not until the final moulding of the cheeses that salt has to be added since salt will impede the action of the propionic acid bacteria.

In anticipation it could be expected that butyric acid bacteria, which are noxious to all cheese production and the spores of which are not killed in pasteurization even at high temperature, should have a fair chance to proliferate during the storage under anaerobic conditions described above.

Since, however, there is no more sugar in the cheese mass at this stage, butyric acid bacteria, like the propionic acid bacteria, will only be able to grow at the expense of the lactates present in the cheese mass. It is therefore important to avoid too much lactate in the cheese mass and to give to the propionic acid bacteria a start in preference to the butyric acid bacteria so that the former will consume the lactates left in the cheese mass before the latter have developed. When the curd is washed as stated above not only free acid but also lactates will be removed and when furthermore the cheese milk be inoculated strongly with propionic acid bacteria a start is given to the said bacteria so that no butyric acid will be formed in the mass, at least not if the temperature does not exceed 23° C. The optimal temperature of the propionic acid bacteria is lower than that of the butyric acid bacteria.

The inoculation of the cheese milk with propionic acid bacteria is thus favorable irrespective of whether the treatment of the cheese mass is carried out in one or the other of the ways described, but it is particularly wanted and generally must be particularly strong in connection with the manner of treatment last mentioned.

By using the process or method according to the present invention hard as well as soft cheeses having the flavor of the Emmentaler cheese may be produced but it is also possible to use for the inoculation of the cheese milk other thermobacteria than *Thermobacterium helveticum* either alone or together with the latter, whereby in some cases cheeses with a taste and flavor different from that of the Emmentaler cheese will be obtained.

I claim:

1. Method of producing rennet cheese having the taste and flavor of Emmentaler cheese, comprising pasteurizing milk at high temperature, cooling the pasteurized milk, starting it with a culture of *Thermobacterium helveticum*, allowing the said microorganism to grow at 40–45° C. until the acidity has reached at least 11° Soxhlet-Henkel, adding rennet, cutting the renneted milk, washing the cheese mass, taking up the cheese, pressing it, and ripening the pressed cheese in the curing room for not substantially more than 3 months.

2. Method of producing rennet cheese having the taste and flavor of Emmentaler cheese, comprising pasteurizing milk at high temperature, cooling the pasteurized milk, starting it with a culture of *Thermobacterium helveticum*, allowing the said microorganism to grow at 40-45° C. until the acidity has reached at least 11° Soxhlet-Henkel, adding rennet, cutting the renneted milk, washing the cheese mass with water to such a degree that pH of the finished cheese will be 5.1-5.2, taking up the cheese, pressing it and ripening the pressed cheese in a curing room for not substantially more than 3 months.

3. Method of producing rennet cheese having the taste and flavor of Emmentaler cheese comprising the addition to milk pasteurized at high temperature of a culture of *Thermobacterium helveticum*, allowing the microorganism to grow at 40-45° C. until the acidity has reached at least 11° Soxhlet-Henkel, adding rennet, and a culture of propionic acid bacteria, cutting the renneted milk, washing the cheese mass to such a degree that pH of the finished cheese will be 5.1-5.2, taking up the cheese, placing it firmly in a container, closing the container by a lid, allowing gas produced during ripening to escape and ripening the cheese at 23° C.

4. Method of producing rennet cheese having the taste and flavor of Emmentaler cheese comprising the addition to milk pasteurized at high temperature of a culture of *Thermobacterium helveticum*, and propionic acid bacteria, allowing the microrganism to grow at 40-45° C. until the acidity has reached at least 11° Soxhlet-Henkel, adding rennet, cutting the renneted milk, washing the cheese mass to such a degree that pH of the finished cheese will be 5.1-5.2, taking up the cheese, placing it firmly in a container, closing the container by a lid, allowing gas produced during ripening to escape and ripening the cheese at 23° C.

SIGURD ORLA-JENSEN.

REFERENCES CITED

The following references are of record in the file of this patent:

UNITED STATES PATENTS

| Number | Name | Date |
|---|---|---|
| 1,334,693 | Doane | Mar. 23, 1920 |
| 1,499,390 | Matheson | July 1, 1924 |
| 1,868,547 | Stevenson | July 26, 1932 |

OTHER REFERENCES

Bulletin of the U. S. Dept. of Agriculture, No. 148, published 1915 by Govt. Printing Office, Wash., D. C., pages 1-16.

"The Microbiology of Foods," by F. W. Tanner, 2nd edition, published in Champaign, Illinois, by Garrard Press, 1944, pages 511, 512 and 515.